United States Patent [19]

Seunik et al.

[11] Patent Number: 4,987,577
[45] Date of Patent: Jan. 22, 1991

[54] GAS LASER HAVING MICROWAVE EXCITATION

[75] Inventors: Horst Seunik; Hans Krueger, both of Munich; Hubert Weber, Augsburg, all of Fed. Rep. of Germany

[73] Assignee: Siemens Aktiengesellschaft, Berlin and Munich, Fed. Rep. of Germany

[21] Appl. No.: 506,822

[22] Filed: Apr. 10, 1990

[30] Foreign Application Priority Data

Apr. 14, 1989 [DE] Fed. Rep. of Germany ....... 3912345

[51] Int. Cl.$^5$ ............................................... H04S 3/097
[52] U.S. Cl. ........................................ 372/82; 372/64;
372/92; 372/77; 372/58; 313/138
[58] Field of Search ....................... 372/82, 77, 92, 64,
372/58, 61, 69, 81; 313/138

[56] References Cited

U.S. PATENT DOCUMENTS

| | | | |
|---|---|---|---|
| 4,756,000 | 7/1988 | Macken | 372/59 |
| 4,759,029 | 7/1988 | Seunik et al. | 372/82 |
| 4,780,881 | 10/1988 | Zhang et al. | 372/81 |
| 4,905,251 | 2/1990 | von Dadelszen | 372/87 |

FOREIGN PATENT DOCUMENTS

| | | |
|---|---|---|
| 0284719 | 10/1988 | European Pat. Off. . |
| 0305893 | 3/1989 | European Pat. Off. . |
| 3743258 | 9/1988 | Fed. Rep. of Germany . |
| 3729053 | 3/1989 | Fed. Rep. of Germany . |

*Primary Examiner*—Léon Scott, Jr.

[57] ABSTRACT

The gas discharge space into which microwaves are fed via a waveguide forms a laser housing in the form of a waveguide having a longitudinal ridge therein, the laser housing being preferably dimensioned such that its critical wavelength $\lambda_k$ is shorter than or equal to the wavelength $\lambda_o$ of the microwave frequency. The gas laser may advantageously be a $CO_2$ gas laser.

24 Claims, 2 Drawing Sheets

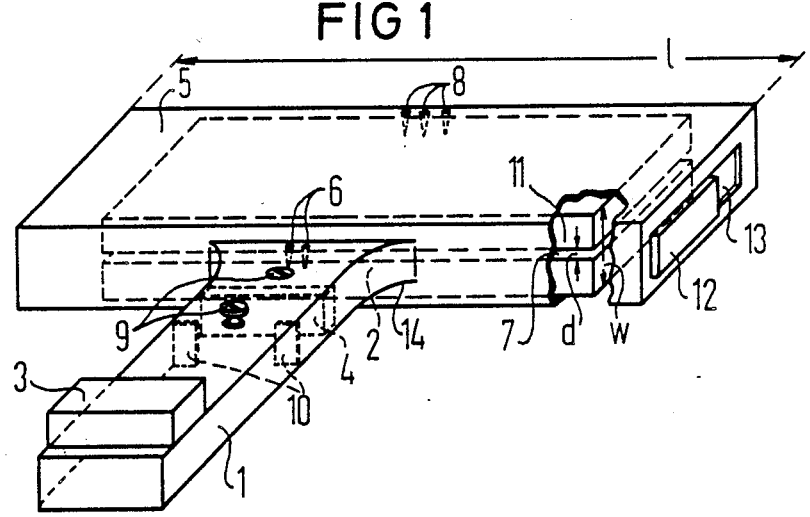
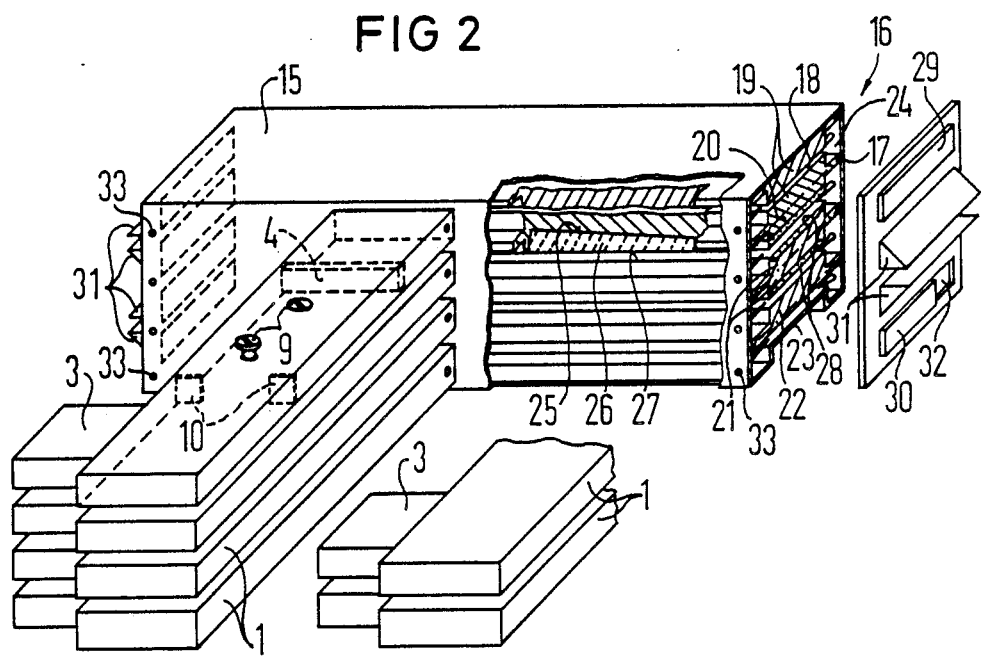

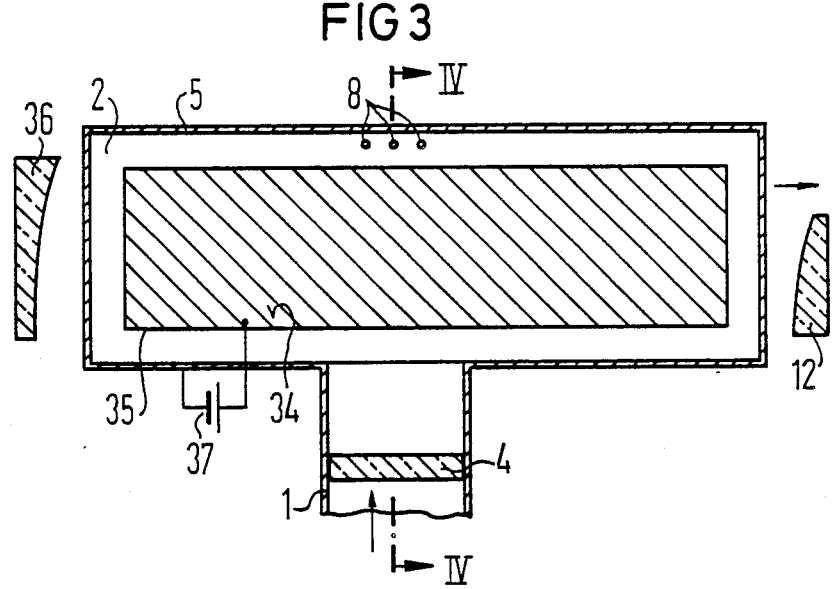
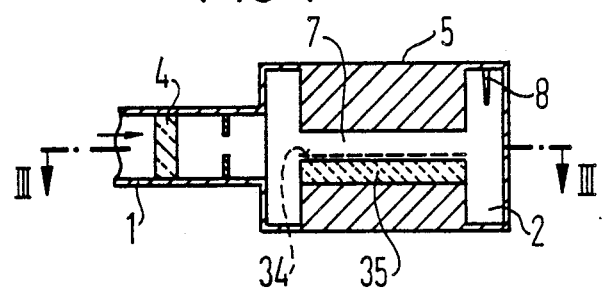

GAS LASER HAVING MICROWAVE EXCITATION

BACKGROUND OF THE INVENTION

1. Field of the Invention:

The present invention relates to a gas laser having microwave excitation, in which a laser housing and at least one waveguide serving the purpose of feeding the microwave form a gas discharge space in which an electrical field conforms at a selected frequency, in which the gas discharge space is closed off from a microwave generator via microwave window, in which the microwave window in a feed unit lies outside the laser housing or in a wall thereof, and in which at least one ignition element for igniting a plasma discharge is arranged in the discharge space.

2. Description of the Prior Art

The German published application No. 37 43 258 discloses a gas laser of the type set forth above. The German published application No. 37 29 053 discloses a high-performance ribbon conductor laser that is excited with radio frequency. The radio frequency is thereby coupled into a gap between bands of insulating material by electrodes that lie against the bands of insulating material.

SUMMARY OF THE INVENTION

The object of the present invention is to reduce the expense for a laser of the type set forth above and to increase the obtainable power/volume.

The above object is achieved, according to the present invention, in a gas laser having microwave excitation, whereby a laser housing and at least one waveguide serving the purpose of feeding the microwave form a gas discharge space in which an electrical field can form at a selected frequency, whereby the gas discharge space is closed off from a microwave generator via a microwave window, whereby the microwave window of the feed unit lies outside the laser housing or in a wall thereof, whereby at least one ignition element for igniting a plasma discharge is arranged in the gas discharge space, and is particularly characterized in that the laser housing forms at least one laser waveguide having a longitudinal ridge, whereby the longitudinal ridge defines a discharge gap for a laser discharge, and in that the ignition element lies outside the discharge gap.

Waveguide lasers can be operated with high gas pressure of, for example, 0.1 bar through 1 bar. Extremely high values for the power density and for the output power obtainable from a given volume thereby arise. The correspondingly high power supply with low expense succeeds on the basis of a microwave feed in accordance with the invention. Generators that are standard for microwave ovens can be utilized. The costs can therefore be kept low.

The ignition element that can be composed of a tip or edge in the gas discharge space in a standard manner does not produce any disturbance of the laser light because of the arrangement of the elements of the present invention. It can therefore be executed relatively large and effective. Therefore, an ignition can also occur outside of the maximum of the electrical field strength of the microwave. The ignited plasma discharge then migrates in the direction of increasing field strength into the discharge gap and ignites a laser discharge in the entire area of the discharge gap.

A pulsed microwave feed is recommended given high values of gas pressure at which no uniform laser discharge over the entire area of the discharge gap is obtained. The plasma discharge thereby migrates from the ignition element in the direction of the microwave window of the feed unit. The microwave pulses are thereby advantageously dimensioned in terms of width and spacing such that, proceeding from the ignition element, the laser discharge barely passes through the discharge gap and the pauses guarantee extinguishing of the plasma discharge that is just sufficient, so that a reignition is possible at the ignition elements. Since the laser discharge lasts beyond the microwave pulse, until the generated plasma is used, a nearly continuous laser beam therefore arises.

The laser waveguide is advantageously equipped with an unstable resonator of the type disclosed in the aforementioned German published application No. 37 29 053. A relatively simple outcoupling of energy and a simple exploitation of the full width of the discharge gap are thereby achieved given high beam intensity. A gas laser constructed in accordance with the present invention is particularly suited for lasers without a laser gas flow or for laser gas slow flow lasers. The gas discharge space is advantageously closed and a circulating pump for laser gas need not be provided. The dimensioning of the gas discharge space is advantageously designed such that the critical wavelength $\lambda_k$ of the gas discharge space is less than or equal to the wavelength $\lambda_o$ in free space corresponding to the microwave energy. An aperiodically-attenuated wave propagation thereby occurs. The microwave feed unit is advantageously arranged perpendicular to the laser housing, whereby the ignition element is arranged behind the discharge gap in an extension of the microwave feed unit, particularly given a pulse mode. One or more ignition tips that project into the discharge space advantageously serve as the ignition element. At least one ignition element is advantageously arranged in a region of high electrical field strength of the microwave energy.

The discharge gap is advantageously formed of electrically-conductive ridges that have a profiled surface at the sides facing towards one another, the profile thereof guaranteeing an approximately constant value of the quotient of the field strength per neutral particle density over the discharge gap. To this end, the ridges are fashioned lying farthest apart in the region of the microwave feed. The profile of the ridges is advantageously supplemented by electrically non-conductive inserts having a complementary profile such that the discharge gap has a constant wall spacing. For optimum waveguide properties, the inserts are equipped with smooth surfaces having extremely low residual roughness at the sides facing towards one another. Ceramic, particularly $Al_2O_3$ ceramic, is suitable as a material for the inserts.

The microwave feed unit is advantageously broadened at least in the direction of the beam propagation in the region of the transition to the laser housing. A better impedance matching arises as a result thereof.

The invention is particularly suited for CO or $CO_2$ lasers. The microwave frequency advantageously lies in the frequency range between 0.5 GHz and 10 GHz. High beam densities can thereby be achieved with an unstable resonator since thickwalled copper mirrors that can be well cooled can be utilized here. Given lower power consumption, a stable resonator can also be utilized without inadmissible heating of the mirrors.

In instances in which a certain inhomogeneity of the field distribution in the discharge gap is not a disturbing factor, it can be advantageous to select the wavelength $\lambda_o$ lower than the critical wavelength $\lambda_k$.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is an oblique view, shown partially broken away, of a first embodiment of a gas laser constructed in accordance with the present invention;

FIG. 2 is an oblique view, shown partially broken away and partially exploded, of another embodiment of a gas laser constructed in accordance with the present invention;

FIG. 3 is a sectional view of a gas laser constructed in accordance with the present invention; and FIG. 4 is another sectional view illustrating still another embodiment of a gas laser constructed in accordance with the present invention.

DESCRIPTION OF THE PREFERRED EMBODIMENTS

Referring to FIG. 1, a waveguide 1 is separated from a gas discharge space 2 via a microwave window 4. The waveguide 1 carries a microwave generator 3 that is preferably a commercially-available embodiment as is commercially available, for example, for microwave ovens. Screws 9 and diaphragms 10 serve the purpose of reducing reflected microwaves.

A high electrical field strength is formed in a discharge gap 7 as a consequence of its small gap width d in comparison to the width w of the waveguide. The discharge gap 7 advantageously has a gap width d of 1.5 mm given a width of about 5 mm for the waveguide. A uniform plasma discharge thereby burns over the entire discharge gap given a gas pressure of 200 mbar in a $CO_2$ laser. When a plasma discharge is ignited by the ignition elements 6 or, respectively, 8, then the plasma discharge quickly migrates into the region of high field strength and therefore concentrates in the discharge gap 7. This is true both when the ignition elements 6 are arranged in the proximity of the microwave window 4 as well as when they are positioned at a suitable, different location in the discharge space such as, for example, the ignition elements 8. The ignition elements are preferably fashioned as electrically-conductive tips. Given an adequate super-elevation of the field in the discharge gap 7, the ignition elements 6 are particularly beneficially arranged in the region of the microwave window 4 since a particularly high electrical field strength of the microwaves may be found at that location. When, by contrast, the laser is utilized in the pulsed mode, this being recommended given high values of the gas pressure, then ignition elements 8 that are located outside of the laser discharge, but at a distance from the feed unit, are to be preferred. In this case, the plasma discharge does not fill out the entire discharge gap but migrates in the direction of increasing field strength proceeding from the ignition elements. During the microwave pulse duration, it therefore migrates in the direction of the microwave source. The laser excitation thereby lasts beyond the microwave feed since the energy stored in the plasma can still be used. Given an appropriate matching of pulse duration and pulse pause, a practically continuous laser beam derives even given driving with microwave pulses.

The gas discharge space is advantageously at least partially coated with a catalyst. The catalyst layers, shown hatched in FIG. 3 and with broken lines in FIG. 4, particularly on the limitations of the discharge gap 7, oppose a decomposition of the $CO_2$ into CO and $O_2$ and the equilibrium of this reaction is displaced towards more $CO_2$. Layers of metals such as gold, platinum, palladium or oxide layers doped with these metals, for example, a doped $SnO_2$ layer, are suitable as the catalyst.

These layers can be applied in a dipping method, by sputtering or by a vapor deposition or in a CVD process. Cu/Au wall coatings that were oxidized in the plasma are also well-suited as catalyst layers.

The walls of the discharge space are passivated, particularly in closed layers, so that no oxygen ($O_x$, $x=1-3$) from the gas discharge is consumed; for example, oxidized, preferably anodized aluminum or oxidized nickel are suitable for this purpose. These layers can be doped with the mentioned catalysts.

An improvement of the catalytic effect and a homogenization of the gas discharge is achieved in that the limiting surfaces of the discharge gap are fashioned electrically conductive and insulated from one another and in that an electrical DC voltage is generated between the limiting surfaces, for example by a DC source 37 (FIG. 3). To this end, a voltaically nonconductive insert 35 (FIGS. 3, 4) of, for example, $Al_2O_3$ ceramic having an electrically-conductive coating 34 can be provided (shown with broken lines in FIG. 4). An additionally-applied magnetic field yields the advantage of a further homogenization of the discharge. The resonator mirrors 12 and 36 form an unstable resonator; the beam emerges at that side of the laser housing 2 facing away from the microwave feed unit 1.

The gas discharge space 2 is dimensioned such that its critical length $\lambda_k$ is equal to or less than the wavelength $\lambda_o$ of the excitation frequency of the provided microwave. An aperiodic propagation of the microwave therefore derives, i.e. an exponential decrease in the electrical field with increasing distance from the feed unit 1. The plasma discharge thereby effects a damping and enables a nearly reflection-free incoupling of the microwave. The entire discharge space can be excited as a result thereof and contribute to the laser discharge. A largely-uniform energy distribution thereby occurs when the wavelength $\lambda_o$ is closely approximated to the critical wavelength $\lambda_k$.

Resonator mirrors 12 and a beam exit window 13 are located at the end faces of the laser housing 5. In the illustrated example, the resonator mirrors 12 form an unstable resonator for the laser emission. This embodiment has the advantage that the resonator mirrors can be solid, easily-cooled metal mirrors, preferably copper mirrors. They can therefore be highly loaded when the laser power has no limits placed thereon proceeding from the mirrors. A stable resonator can also be utilized. In this case, one of the resonator mirrors must be fashioned partially transmissive in a known manner; it can therefore only have a slight thickness of its metal layer and the cooling possibilities are limited.

Adjoining the laser housing 5, the feed unit 1 has a transition region 14 that is expanded in the direction of the greatest expanse of the laser housing 5. An improved matching to the laser housing thereby derives. In the example of FIG. 2, four laser waveguides 16 are fashioned in a laser housing 15, these four laser waveguides 16 being joined to form a uniform structure and their limitations being identified by broken lines 17. Each of the laser waveguides 16 contains a respective discharge gap 18 that is formed by ridges 19-23. The discharge gaps 18 are limited by cavities 24 that augment the structure into a waveguide having a longitudinal ridge. The discharge space 18 can be formed by symmetrically-constructed ridges 19 in the middle of the waveguide, by asymmetrical ridges 21, 22 or by only one ridge 23 and a limitation of the waveguide. The ridges 20 and 21 have a profile 25 into which inserts 26, 28 having a complementary profile are inserted. The inserts 26, 28 are composed of electrically non-conductive material and each have a surface 27 that limits the discharge channel 18 and each has a surface quality that is adequate for the wave guidance of the laser light. An optimum relationship of the electrical field strength E to the neutral particle density N is guaranteed in the entire discharge gap by this embodiment. The inserts 28 in the ridges 21 have a profile that also compensates a drop of the field strength relative to the beam direction of the laser emission.

The laser emission of the laser waveguides 16 is reflected at a pair of mirrors 29 and 30, whereby these mirrors form an unstable resonator. In the beam path between these mirrors, the laser beam is deflected from one laser waveguide 16 to the next with prisms 31 or appropriate mirrors and is supplied to the respective neighboring discharge gap 18. A meander-shaped laser beam thus arises between the laser mirrors 29 and 30. The laser beam is directed out via an exit window 32 for utilization.

This embodiment enables a high efficiency of the laser power and extremely-high absolute laser powers. Accordingly, high microwave powers are required. In order to be able to utilize commercially-available microwave generators for this purpose, each of the microwave generators 3 are respectively connected to a corresponding feed unit 1, whereby a plurality of feed units 1 are connected to a laser housing 15. In the present example, the feed units 1 are arranged in the manner of a matrix, whereby respectively two feed units 1 feed a respective laser waveguide 16. An arbitrarily-high energy that can be set in steps can therefore be fed into a gas laser constructed in accordance with the invention with commercially-available parts. The feed units are thereby operated in a phase-coupled manner.

The laser housing of a gas laser constructed in accordance with the present invention can be manufactured of metal. Vacuum-tight metal-to-ceramic or metal-to-glass transitions are not required. A cost-effective structure thereby derives.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a gas laser of the type having microwave excitation, and which comprises a housing and at least one waveguide of a feed unit coupled to said housing for the purpose of feeding microwave energy thereto, said housing and said waveguide form a gas discharge space in which an electrical field is formed at a selected frequency, said gas discharge space is closed off from a microwave generator via a microwave window in the feed unit, said microwave generator lying outside of the laser housing, at least one ignition element for igniting a plasma discharge is arranged in the discharge space, the improvement comprising:

said laser housing including laser waveguide means forming at least one laser one waveguide including a longitudinal ridge in said laser housing;

said longitudinal ridge forming a part of a discharge gap for a laser discharge; and said at least one ignition element is mounted to said housing outside of said discharge gap to increase the obtainable power/volume.

2. The improved gas laser of claim 1, and further comprising:

an unstable resonator.

3. The improved gas laser of claim 1, wherein:

said gas discharge space is closed such that the gas laser gas does not flow.

4. The improved gas laser of claim 1, wherein:

said gas discharge space comprises dimensions which guarantee a field strength in the discharge gap that is greater than the field strength in the gas discharge space outside of said discharge gap; and a wavelength $\lambda_o$ corresponding to the microwave frequency is greater than or equal to a critical wavelength $\lambda_k$ of the discharge space so that an aperiodic wave propagation occurs in said discharge gap.

5. The improved gas laser of claim 1, wherein:

said at least one ignition element is in a region of high electrical field strength of the microwave energy.

6. The improved gas laser of claim 5, wherein:

said microwave feed unit is perpendicular to said laser housing; and said at least one ignition, element is behind the discharge gap in opposing position to said microwave feed unit.

7. The improved gas laser of claim 5, wherein:

said ignition element is in the region of the microwave feed.

8. The improved gas laser of claim 1, wherein:

said at least one ignition element comprises a plurality of ignition tips that project into said gas discharge space.

9. The improved gas laser of claim 1, wherein:

said laser waveguide is formed of opposed electrically-conductive ridges that have profiled surfaces facing one another, the profiles thereof guaranteeing an approximately constant value of a quotient of field strength to density of neutral particles over ribbon conductors defined by said profiles.

10. The improved gas laser of claim 9, wherein:

said ridges are spaced a greater distance from one another in the region of the microwave feed.

11. The improved gas laser of claim 9, wherein:

non-conductive inserts are provided on said ridges and have complementary profiles to that of said ridges so that a gap having a constant wall spacing is provided for the discharge.

12. The improved gas laser of claim 11, wherein:

said inserts comprise a ceramic material.

13. The improved gas laser of claim 12, wherein:

said ceramic material comprises $Al_2O_3$.

14. The improved gas laser of claim 11, wherein:

said inserts comprise smooth surfaces having extremely low residual roughness at sides facing towards one another.

15. The improved gas laser of claim 1, wherein:

said microwave feed unit comprises a broadened section in the direction of beam propagation in the region of transition of said feed units to said laser housing.

16. The improved gas laser of claim 1, wherein:

a plurality of microwave feed units are coupled to said laser housing.

17. The improved gas laser of claim 16, wherein:

said plurality of microwave feed units are arranged following one another in the direction of the laser discharge and each is coupled to feed into said laser housing.

18. The improved gas laser of claim 17, wherein:

each of said waveguides comprises longitudinal ridges above one another;

each of said waveguides is fed by at least one feed unit; and a plurality of deflection elements are provided to couple the laser emission from one waveguide to the next; and an exit window for laser emission is located at one end of one of said laser waveguides.

19. The improved gas laser of claim 1, wherein:

said microwave frequency is in the range of between 0.5 GHz and 10 GHz.

20. In a gas laser of the type having microwave excitation, and which comprises a housing and at least one waveguide of a feed unit coupled to said housing for the purpose of feeding microwave energy thereto, said housing and said waveguide form a gas discharge space in which an electrical field is formed at a selected frequency, said gas discharge space is closed off from a microwave generator via a microwave window in the feed unit, said microwave generator lying outside of the laser housing, at least one ignition element for igniting a plasma discharge is arranged in the discharge space, the improvement comprising:

said laser housing including laser waveguide means forming at least one laser waveguide including a longitudinal ridge in said laser housing;

sand longitudinal ridge forming a part of a discharge gap for a laser discharge;

said at least one ignition element is mounted to said laser housing outside of said discharge gap to increase the obtainable power/volume; and said laser waveguide further comprising an inner wall and a coating on said inner wall comprising a catalyst material which prevents a decomposition of $CO_2$ into $CO$ and $O_2$ or at least partially cancel such a decomposition and does not bond oxygen, particularly nascent oxygen.

21. The improved gas laser of claim 20, wherein:

said catalyst material comprises a substance selected from the group consisting of gold, platinum and palladium.

22. The improved gas laser of claim 20 wherein:

said catalyst material comprises a substance selected from the group consisting of anodized aluminum and nickel coated with nickel oxide.

23. The improved gas laser of claim 22, wherein:

said catalyst material comprises $SnO_2$.

24. The improved gas laser of claim 20, wherein:

said catalyst material comprises an oxide doped with at least one material selected from the group consisting of Au, Pt and Pd.

* * * * *